US011919646B2

(12) United States Patent
Jensen et al.

(10) Patent No.: US 11,919,646 B2
(45) Date of Patent: Mar. 5, 2024

(54) AIRCRAFT PASSENGER SEAT, AND SEAT ROW

(71) Applicant: ZIM AIRCRAFT SEATING GMBH, Immenstaad am Bodensee (DE)

(72) Inventors: Alexander Jensen, Friedrichshafen (DE); Marc Dittrich, Amtzell (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/818,743

(22) Filed: Aug. 10, 2022

(65) Prior Publication Data

US 2022/0380055 A1    Dec. 1, 2022

Related U.S. Application Data

(63) Continuation of application No. PCT/EP2021/055459, filed on Mar. 4, 2021.

(30) Foreign Application Priority Data

Mar. 5, 2020    (DE) .................... 10 2020 106 031.9

(51) Int. Cl.
*B64D 11/06*    (2006.01)
(52) U.S. Cl.
CPC ...... *B64D 11/0648* (2014.12); *B64D 11/0638* (2014.12); *B64D 11/0606* (2014.12)
(58) Field of Classification Search
CPC ........................ B64D 11/0605; B64D 11/0638
See application file for complete search history.

(56) References Cited

U.S. PATENT DOCUMENTS

| 3,795,422 A | 3/1974 | Robinson et al. |
| 3,968,992 A | 7/1976 | Hogan |
| 4,281,874 A | 8/1981 | Iwans et al. |

(Continued)

FOREIGN PATENT DOCUMENTS

| CN | 104290664 A |   | 1/2015 |   |
| CN | 104842887 A | * | 8/2015 | ............. B60N 3/001 |

(Continued)

OTHER PUBLICATIONS

Chinese Office Action (with English Translation) (Application No. 202180019083.7).
German Search Report (Application No. 10 2020 106 031.9) dated Feb. 19, 2021.

(Continued)

*Primary Examiner* — Richard Green
(74) *Attorney, Agent, or Firm* — BURR PATENT LAW, PLLC (57) ABSTRACT

An aircraft passenger seat is proposed, comprising a structural component, on which a tray table of the aircraft passenger seat is held via a hinge assembly, the tray table being pivotable about a pivot axis of the hinge assembly. According to the invention, a connection assembly for detachably fitting the tray table on the structural component is provided, the connection assembly comprising an adjustment mechanism for adjusting a mounting position for the tray table relative to the structural component, the adjustment mechanism being designed such that the mounting position can be selected from a plurality of different mounting positions for the tray table relative to the structural component.

9 Claims, 5 Drawing Sheets

(56) References Cited

U.S. PATENT DOCUMENTS

| | | | |
|---|---|---|---|
| 4,898,426 A * | 2/1990 | Schulz | B64D 11/0649 |
| | | | 297/445.1 |
| 5,046,433 A | 9/1991 | Kramer et al. | |
| 5,221,070 A * | 6/1993 | Heilmer | A47B 23/02 |
| | | | 248/458 |
| 5,370,060 A | 12/1994 | Wang | |
| 8,336,957 B2 * | 12/2012 | Roy | B64D 11/0638 |
| | | | 297/165 |
| 2008/0073946 A1 * | 3/2008 | Maione | A47C 7/70 |
| | | | 297/161 |
| 2009/0026812 A1 * | 1/2009 | Figueras Mitjans | A47C 7/70 |
| | | | 297/162 |
| 2011/0204683 A1 | 8/2011 | Roy et al. | |
| 2015/0021969 A1 | 1/2015 | Yin et al. | |
| 2017/0369173 A1 | 12/2017 | Lee et al. | |
| 2018/0229848 A1 | 8/2018 | Murray et al. | |
| 2019/0283881 A1 | 9/2019 | Colletti | |

FOREIGN PATENT DOCUMENTS

| | | | | |
|---|---|---|---|---|
| CN | 105691265 A | | 6/2016 | |
| CN | 107539182 A | | 1/2018 | |
| DE | 30 19 040 A1 | | 12/1980 | |
| DE | 195 16 011 C1 | | 8/1996 | |
| DE | 202009000895 U1 | * | 8/2009 | ............ B60N 3/002 |
| EP | 3 081 492 A1 | | 10/2016 | |
| FR | 2656841 A | * | 7/1991 | ............ B60N 3/004 |
| WO | WO-2014068146 A2 | * | 5/2014 | ............ B60N 3/002 |
| WO | 2018/187070 A1 | | 10/2018 | |

OTHER PUBLICATIONS

International Search Report and Written Opinion (Application No. PCT/EP2021/055459) dated Jun. 7, 2021 (with English translation).
International Preliminary Report on Patentability (with Chapter II Claims) (Application No. PCT/EP2021/055459) dated Feb. 14, 2022 (with English translation).

* cited by examiner

AIRCRAFT PASSENGER SEAT, AND SEAT ROW

CROSS REFERENCE TO RELATED APPLICATIONS

This application is a continuation of International Application No. PCT/EP2021/055459 filed Mar. 4, 2021, which designated the United States, and claims the benefit under 35 USC § 119(a)-(d) of German Application No. 10 2020 106 031.9 filed Mar. 5, 2020, the entireties of which are incorporated herein by reference.

FIELD OF THE INVENTION

The present invention relates to an aircraft passenger seat, and seat row.

BACKGROUND OF THE INVENTION

Aircraft passenger seats and seat rows having conventionally a plurality of aircraft passenger seats next to one another are known in a multiplicity of embodiments for equipping aircraft for passenger transport, such as passenger aircraft.

The design of the aircraft passenger seats necessitates providing a high level of user and operational comfort, for example, with different functions, in an extremely confined space and while maintaining safety standards. In particular, a flexible adaptation of the functions and the functional elements thereof is desired.

SUMMARY OF THE INVENTION

It is the object of the present invention to provide an improved aircraft passenger seat with which a high level of user and operational comfort can be flexibly satisfied.

The present invention is based on an aircraft passenger seat comprising a structural component on which a table top of the aircraft passenger seat is held via a joint arrangement, wherein the table top is pivotable about a pivot axis of the joint arrangement.

The structural component preferably belongs to a mechanically supporting structure of the aircraft passenger seat, such as a basic structure of the aircraft passenger seat or, for example, of a seat frame. The supporting structure of the aircraft passenger seat is, for example, a mechanically supporting basic structure, for example, a rigid frame of the aircraft passenger seat, for example, consisting of a plurality of mechanically stable frame sections or frame elements, such as rigid elongate and/or planar components made, for example, of a metal material. The structural component is preferably part of the frame or is such a frame element. The frame elements are as a rule fixedly interconnected to the basic structure. The frame forms, for example, the mechanically stable, three-dimensional basic structure of the aircraft passenger seat or basic structure located on the inside of the finished aircraft passenger seat. The frame with the structural component is generally not visible from the outside on the finished aircraft passenger seat, for example, is concealed by a housing and/or upholstery. The frame absorbs forces and/or torques acting on the aircraft passenger seat with the person sitting thereon and conducts them into adjacent sections, such as, for example, a cabin floor of an aircraft cabin in which the aircraft passenger seat is mounted, for example, is screwed to a floor of the aircraft cabin. Further elements of the aircraft passenger seat can be mounted on the frame, including seat base upholstery, backrest upholstery, leg supports or add-on elements, such as, for example, a foldable table top, armrests or storage compartments of the aircraft passenger seat.

The essence of the present invention consists in that a connecting arrangement for releasably attaching the table top to the structural component is provided, the connecting arrangement comprising an adjustment mechanism for adjusting a mounting position of the table top relative to the structural component, the adjustment mechanism being designed in such a manner that the mounting position can be selected from a plurality of different mounting positions for the table top relative to the structural component. An adjustment of the table top on the aircraft passenger seat is, therefore, possible, in particular, in order to bring the table top into an exactly predetermined or desired attachment position and, therefore, use position. With the connecting arrangement and the adjustment mechanism, the table top can be brought on the aircraft passenger seat, in particular, on the rear side of the aircraft passenger seat, into the desired attachment position on the aircraft passenger seat, preferably continuously or in displacement steps differing in tiny increments. The adjustment of the attachment position is changeable or adjustable or displaceable in position, in particular, in millimeter steps. Accordingly, adjacently possible mounting or attachment positions differ by, for exactly, circa one or more millimeters or by a few angular degrees when the table top is adjusted in inclination in the use state.

The structural component is, in particular, a component which extends in the region of a backrest of the aircraft passenger seat. For example, two respective elongate, plate-like, upright structural components are provided on a basic structure, the structural components being present on both sides in the region of the extent of the backrest of the aircraft passenger seat. The structural component preferably has a sandwich structure in order to obtain high mechanical stability at a low weight. The basic structure of the aircraft passenger seat comprises, for example, preferably two strip-shaped structural components which are spaced apart horizontally in a width direction of the aircraft passenger seat and extend vertically in the height of the aircraft passenger seat. Each of the two structural components present over the height of the backrest in a lateral region of the aircraft passenger seat is preferably provided with a connecting arrangement for releasably attaching the table top to the structural components. This is because the table top is attached in an articulated manner or suspended on the aircraft passenger seat preferably at two points. The two points relate, for example, to two points on a rear longitudinal edge of the table top. In addition, generally, on a first component of the table top there is, in an articulated manner, a further component of the table top or an additional table top which can be folded up and folded away or back relative to the first table top component which is attached in an articulated manner to the structural component.

In principle, an articulated attaching of the table top alternatively at precisely one point or with precisely one joint to precisely one structural component is conceivable.

A table top is preferably connected to the structural component via two attaching or mounting points which are present on the table top, for example, on a rear end side of the table top. Preferably at both points, the adjustment of the mounting position is possible preferably separately or independently of the adjustment at the other point. With the adjustment, not only is the mounting position finely adjustable or precisely adjustable, but so too is the spatial orientation of the table top. The table top can thus be positioned exactly on the aircraft passenger seat such that the table top in the use position can be brought, for example, into an exact lateral, height and horizontal orientation of the table top, for example, with the surface side or with the depositing surface, which can be provided by the table top, as per an upper side of the table top into a desired horizontal position. An inclination of the longitudinal axis of the aircraft prevailing in the flight mode and differing from the horizontal can also be taken into consideration, and, therefore, the table top is oriented with its table top surface horizontally throughout the predominant duration of the flight. It is, therefore, ensured that objects deposited on the table top in the flight mode do not slide away or drop down.

The table top is preferably connected to an associated side or a structural component, for example, on the inside, via two attachment points, for example, in the region of a respective joint arrangement for folding the table top up and down on the aircraft passenger seat. The opposite and horizontally spaced-apart structural components form, for example, two floor-supported vertical supports of the basic structure that generally, in the upper end region of the structural components, comprises a transverse element which rigidly connects the two structural components to each other.

In an advantageous manner, the adjustment mechanism is designed to establish the mounting position of the table top along a first displacement direction and in addition to establish the mounting position of the table top along a second displacement direction, the first displacement direction and the second displacement direction being at an angle with respect to each other. The two displacement directions preferably define two axes in space which are or are oriented at right angles or perpendicularly to each other. The displacement directions preferably comprise precisely two axes in space or spatial directions or three axes in space that are perpendicular to one another. For example, the first displacement direction is a perpendicular or vertical direction and a second displacement direction is a horizontal direction. A third displacement direction can be a further horizontal direction which is perpendicular to the first horizontal direction.

The adjustment along the first displacement direction relates, for example, to a height adjustment of the table top, the adjustment along the second displacement direction relates, for example, to a side adjustment of the table top, and the adjustment along the third adjustment direction relates, for example, to a depth adjustment of the table top.

A further displacement direction relates to an adjustment of the table top about an axis, for example, in order to adjust the inclination of the table top. A desired use state of the table top is used as the basis here, preferably with respect to an inclination of the aircraft longitudinal axis in an endurance flight mode with an oblique orientation of the aircraft longitudinal axis differing from the orientation of the longitudinal axis on the ground or in descent since the table top is then generally not used.

In an advantageous embodiment of the adjustment mechanism, according to which the table top is preferably in each case independently adjustable in three displacement directions, the table top can be oriented optimally spatially, for example, in a height position, in a lateral position and in a depth position of the table top relative to the structural component.

The adjustment mechanisms are preferably configured in such a manner that an adjustment of the inclination of the table top in its unfolded position is possible. The table top can thus be brought with its upper side into a horizontal surface orientation. The effect, therefore, achieved in the flight mode is that objects, such as drinking vessels and crockery, deposited on the table top cannot slip down since the table top is horizontal.

It is also of advantage if the table top is pivotable with the joint arrangement from an upright position of the table top folded-up against the structural component into a use position of the table top protruding on the structural component and back from the use position into the upright position, the adjustment mechanism comprising an inclination adjustment mechanism which is designed for adjusting the inclination of the table top in the use position of the table top.

With the joint arrangement, the table top when not in use can be folded against, for example, the rear side of the aircraft passenger seat or against a rear side of a housing of the aircraft passenger seat. The table top is then accommodated in a space-saving manner or oriented with its surface sides vertically and does not project, for example, annoyingly into a movement space of a person sitting behind the aircraft passenger seat and who is using the table top in the use position. For this purpose, the table top is folded down from the, for example, upwardly folded upright position into the use position.

With the inclination adjustment mechanism, when the table top protruding on the rear side of the aircraft passenger seat is in the use position, a planar use side of the table top or an upper side of the table top can be brought in inclination preferably into a desired approximately or exactly horizontal orientation, with respect to a selected orientation or inclination of the aircraft passenger seat or the vertical axis thereof. The orientation of the vertical axis of the aircraft passenger seat of a passenger aircraft located on the ground differs from the orientation of the vertical axis of the aircraft passenger seat in the flight mode of the passenger aircraft. The orientation of the folded-down table top in the use position is also dependent thereon. It is desired in this connection for the upper side of the table top to be oriented parallel to the horizontal in the use position. This orientation in the use state is advantageous with respect to the flight mode of the associated passenger aircraft. An aircraft cabin floor on which the aircraft passenger seat is mounted is oriented rising in the sitting direction or forward generally at an angle to the horizontal. In an advantageous manner, it is possible with the inclination adjustment mechanism for objects deposited on the table top, such as drinking vessels or crockery, such as a plate, to be able to be deposited stably on the upper side of the table top.

An advantageous modification of the present invention consists in that the adjustment mechanism comprises a height adjustment mechanism which is configured for adjusting a height mounting position of the table top along a vertical displacement direction.

The vertical displacement direction is based on an installation state of the table top on the aircraft passenger seat. With the vertical displacement direction, a desired height position can be adapted, for example, to a respectively desired position along the vertical or with respect to, for example, a distance of the aircraft cabin floor from the table top.

Furthermore, it is of advantage that the adjustment mechanism comprises a side adjustment mechanism which is configured for adjusting a side mounting position of the table top along a horizontal displacement direction.

With the lateral adjustment mechanism, an exact lateral orientation, for example, in the width direction or transversely with respect to the sitting direction or centrally on the aircraft passenger seat or, for example, between two structural components of the aircraft passenger seat is possible.

It is furthermore advantageous that the adjustment mechanism comprises a screw connection with a screw element which reaches through an elongated hole and is screwable into a threaded section.

The screw connection is a stable and space-saving option for adjusting the mounting position. In addition, advantageously with the screw connection, along with the adjustment of the mounting position, the attaching of the connecting arrangement to the structural component and/or to the table top and/or of elements of the connecting arrangement to one another can be established at the same time.

The respective screw connection advantageously comprises precisely two screw elements with a respective screw hole.

According to an advantageous modification, the connecting arrangement comprises a plurality of connecting components, a first connecting component being fastened to the structural component and the first connecting component being connected to a second connecting component of the connecting arrangement.

The attaching of the connecting arrangement to the structural component is, therefore, possible simply or in just a few steps.

For the fastening of the first connecting component, suitable sections, for example, are provided on the first connecting component itself and correspondingly on the structural component, for example, with openings for, for example, rivet elements or with screw-on openings with an internal thread for mating screw means with an external thread.

The plurality of connecting components of the structural unit are preferably interconnected by screw elements. Each screw element preferably reaches through an associated elongated hole in the first connecting component.

According thereto, it is advantageous if connecting mechanisms are realized on the first connecting component and/or on the second connecting component in order to connect the second connecting component to the first connecting component. These connecting mechanisms are preferably screw elements.

Preferably, the connecting components belong to the adjustment mechanism or the connecting components form the connecting arrangement and at the same time the adjustment mechanism.

Another advantage is afforded if the second connecting component is connected to the joint arrangement.

The second connecting component preferably engages on the joint arrangement.

The second connecting component and the joint arrangement are preferably interconnected by a screw connection; preferably with precisely two screw elements, such as screws with a fine-pitch external thread, which engage in two associated screw holes with a fine-pitch internal thread.

The screw elements reach through one elongated hole each on the second connecting component.

The longitudinal extents of the, for example, two elongated holes in the first connecting component are preferably parallel to each other.

The longitudinal extents of the, for example, two elongated holes in the second connecting component are preferably parallel to each other.

The longitudinal extent of the elongated holes in the first connecting component is preferably perpendicular to the longitudinal extent of the elongated holes in the second connecting component.

Furthermore, an advantageous refinement consists in that the height adjustment mechanism comprises a screw connection with a first screw element which reaches through a first elongated hole and with a second screw element which reaches through a second elongated hole. This constitutes a stable height adjustment.

Advantageous or preferably configured embodiments which are not restrictive or are in addition to other possible variants are discussed below.

A respective elongated hole or the two elongated holes belonging together in pairs of the height adjustment mechanisms preferably do not have an internal thread since the elongated holes serve for the respective screw element to reach through them, but not for the interaction with the external thread of the screw element. However, in the reaching-through direction behind the section with the elongated hole or the component section connected behind the latter, there is preferably an internal thread into which the external thread of the screw element is suitably screwable.

The elongated holes, which are provided in pairs, for the height adjustment, like the two elongated holes belonging to the lateral adjustment, are separate from one another with regard to a pair of elongated holes. The respective screw element is screwable in each case into a mating threaded section which is present in the reaching-through direction in the component behind the elongated hole. The screw element is screwed in until the section or the component with the elongated hole is clamped and is fixed in its position by the screw element and the component with the internal thread. The two screw elements belonging to a pair of elongated holes are, like the elongated holes, offset next to each other, preferably offset vertically, and are offset horizontally or laterally with respect to one another in the lateral adjustment.

For example, the first and the second elongated hole of the height adjustment mechanism, through which the respectively associated screw element reaches, are formed on the first connecting component. A respective threaded section for the respective two screw elements is preferably present in the second connecting component.

According to one advantage of the present invention, the side adjustment mechanism comprises a screw connection with a first screw element which reaches through a first elongated hole and with a second screw element which reaches through a second elongated hole.

The lateral adjustment mechanism with the screw connection also comprises, in addition to the screw elements and the elongated holes, in each case, a first internal threaded section in a first hole and a second internal threaded section in a second hole, in each case, in a component behind the second connecting component, such as preferably a joint part of the joint arrangement.

The elongated holes which are provided without an internal thread are separate from one another. An elongated hole of the lateral adjustment mechanism, through which the associated screw element reaches, is formed on the second adjustment component. A respective threaded section for the two screw elements is preferably formed in a joint component of the joint arrangement. The internal threaded sections of the height adjustment mechanism and of the lateral adjustment mechanism are preferably oriented parallel or, accordingly, the longitudinal axis of the respective screw elements is.

The first elongated hole and the second elongated hole of the height adjustment mechanism and the first elongated hole of the lateral adjustment mechanism are in each case separate elongated holes.

Accordingly, the two elongated holes of the lateral adjustment mechanism are in each case separate, parallel elongated holes.

Furthermore, it is of advantage that the inclination adjustment mechanism comprises a screw element, rotation of the screw element causing a part of the joint arrangement to be displaced about the pivot axis provided by the joint arrangement. The inclination of the table top in the use position can, therefore, be established simply and continuously, for example, with a screwdriving tool.

The table top of the aircraft passenger seat is preferably attached releasably by two connecting arrangements to two structural components which are spaced apart from each other. A mechanically stable two-point attachment or suspension of the table top is, therefore, realized. A joint arrangement for folding the table top is preferably realized at the two attachment points.

The fastening preferably takes place on mutually facing inner sides or surface sides of the structural components. The table top preferably comprises a first table top component engaging on the structural component and a further table top component, for example, an additional table top, which engages in an articulated manner on the first table top component. The further table top component can be provided folded up against the first table top component in a manner parallel thereto or can be provided extending the latter in a manner aligned flush with the surface thereof. The usable depositing surface of a table comprising the table top can, therefore, be enlarged. In addition, the further table top component when not in use can be folded compactly against, for example, the upper side of the first table top component during use of the table top.

The present invention also extends to a seat row comprising a plurality of aircraft passenger seats present next to one another according to one of the above-described embodiments. The advantages discussed can, therefore, be achieved at a seat row having a plurality of aircraft passenger seats in an aircraft. The aircraft passenger seats are preferably present laterally aligned with one another in the aircraft.

For a comfortable sitting sensation of an aircraft passenger, a sitting space of an aircraft passenger seat has a preferably upholstered seat base and a backrest with upholstery. In an aircraft, two or more aircraft passenger seats are generally connected in alignment next to one another to form a seat row.

BRIEF DESCRIPTION OF THE DRAWINGS

Further features and advantages of the present invention are explained in more detail below with reference to a schematically illustrated exemplary embodiment.

DETAILED DESCRIPTION OF THE INVENTION

Figure 1:
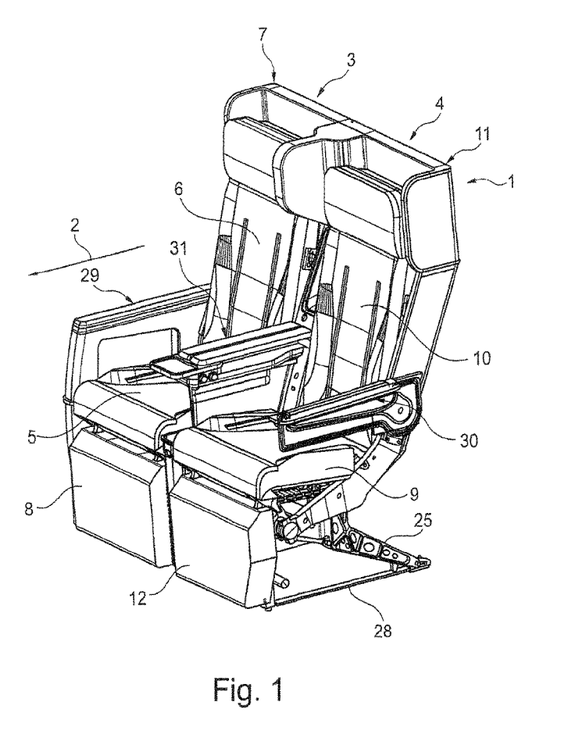
FIG. 1 shows a perspective view obliquely from the front of a seat row with two aircraft passenger seats, in each case comprising a seat base, a backrest together with the rear housing, and a leg support.

FIG. 1 shows a seat row 1 with a sitting direction 2 with two aircraft passenger seats 3 and 4. Position and directional information such as front, rear, top and bottom refer below to the sitting direction 2 and to the use state of the seat row 1.

The two aircraft passenger seats 3 and 4 are correspondingly constructed. The aircraft passenger seat 3 has a seat base 5, a backrest 6, and a housing 7 on the rear side of the backrest 6. Adjoining a front end region of the seat base 5 is a preferably foldable leg support 8 which is foldable about a horizontal axis.

Accordingly, the aircraft passenger seat 4 comprises a seat base 9, a backrest 10, a housing 11, and a leg support 12.

The seat bases 5, 9, the backrests 6, 10 and the leg supports 8, 12 comprise a preferably ergonomically shaped upholstery.

The aircraft passenger seats 3 and 4 can be mounted via two supporting legs 13, 14 on a cabin floor of an aircraft cabin of an associated aircraft.

For this purpose, the supporting leg 13 has a mounting point 17 on a lower end region 16 of a front strut 15, and a further mounting point 20 on a lower end region 19 of a rear strut 18. A bracing element 21 is provided between the end regions 16 and 19.

The supporting leg 14 has a mounting point 24 on a lower end region 23 of a front strut 22 and a further mounting point 27 on a lower end region 26 of a rear strut 25. A bracing element 28 is provided between the end regions 23 and 26.

The seat row 1 additionally has an outer armrest 29 to the side of the aircraft passenger seat 3 and an outer armrest 30 to the side of the aircraft passenger seat 4. Between the two aircraft passenger seats 3 and 4, there is a console 31, preferably level with the two outer armrests 29 and 30, which can likewise be used by an aircraft passenger as an arm support.

The respectively associated backrest 6 or 10 is arranged in a shell shape of the respective housing 7 or 11. The backrest 6 or 10 is preferably movably guided in the housing 7 or 11 for setting different tilting positions, for example, together with the associated displaceably mounted seat base 5 or 9.

Figure 2:
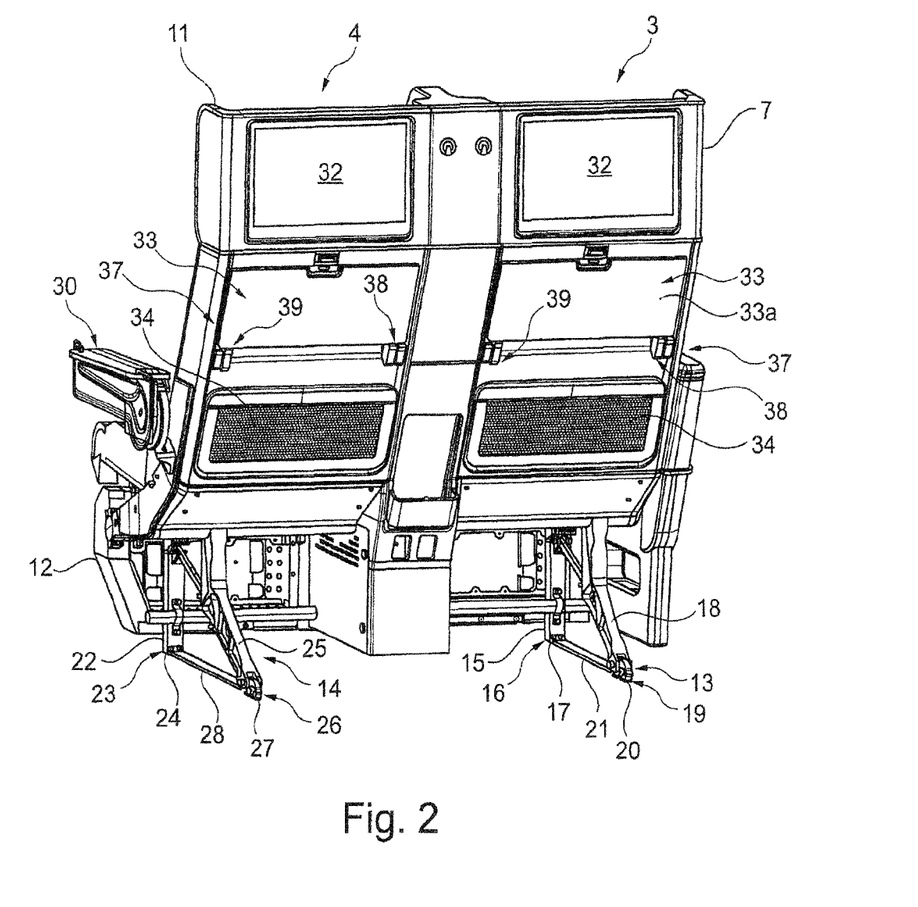
FIG. 2 shows the seat row according to FIG. 1 in a perspective view obliquely from the rear.

The housings 7 and 11 are provided with further elements, for example, on the rear side, in each case, with additional functions. For example, in each case, a multimedia unit 32 for digital media is provided in an upper rear region of the housings 7, 11, for example, with an electronic input and output device or with a touchscreen.

For example, in each case, a foldable table top 33 for the respective aircraft passenger seat 3 and 4, such as a tray table, is formed in a region adjoining below the multimedia unit 32 or a central region. In FIG. 2, the table tops 33 are illustrated in an upwardly folded-up, vertical and secured stowage or non-use position.

An upwardly opened storage compartment with a flexible mesh cover 34, for example, for accommodating magazines or brochures or other objects, is present below the respective foldable table top 33.

The table top 33 will be explained in more detail below with respect to the aircraft passenger seat 3, the table top 33 on the aircraft passenger seat 4 being constructed identically.

The table top 33, which has a planar covering 33a which is visible in FIG. 2 and is present on the outer side, for example, a thin covering element, comprises two table top components which are connected in an articulated manner and comprise a first table top component 35 and a second table top component 36 (see FIG. 3) which serves as an additional table top for optionally enlarging a usable table surface of the table top 33. For the pivotable or foldable arrangement of the table top 33 on the aircraft passenger seat 3 or 4, there is, in each case, a joint arrangement with a fitting 37 comprising a fitting part 38 and a further fitting part 39.

Figure 3:
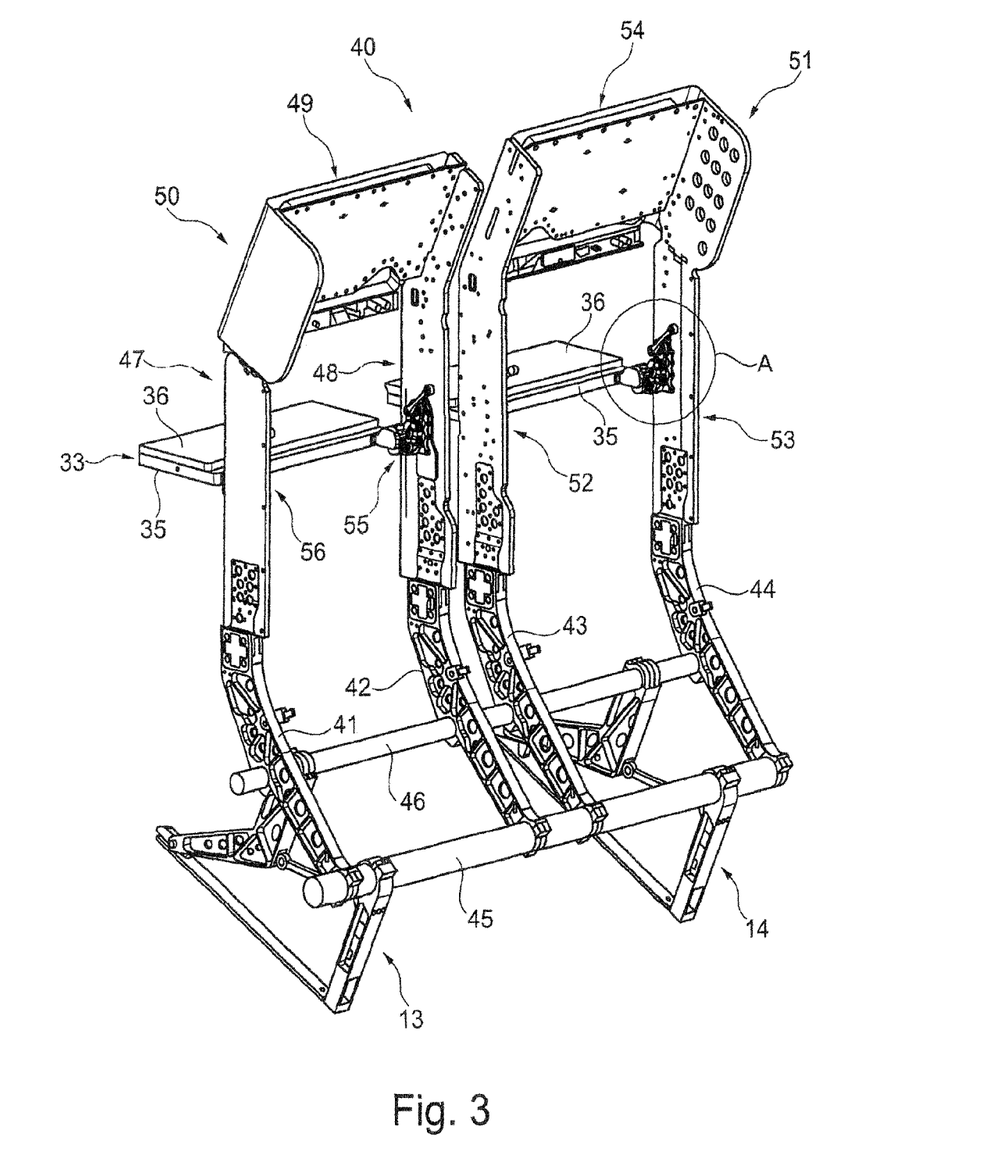
FIG. 3 shows a basic structure of the aircraft passenger seats according to FIGS. 1 and 2 perspectively obliquely from the front and each having a table top in a use position.

FIG. 3 shows a basic structure 40 or here by way of example a seat frame of the aircraft passenger seats 3, 4 according to FIGS. 1 and 2. On a rear side of the basic structure 40, the two table tops 33 are illustrated in a horizontal use position which are folded down from the upright position according to FIG. 2 and which belong to each of the two aircraft passenger seats 3, 4 according to FIGS. 1 and 2.

The basic structure 40 is preferably designed as a supporting structure for the two aircraft passenger seats 3, 4. The basic structure 40 is, in particular, designed to be mechanically stable or as a load-absorbing basic structure 40 with a substantially rigid construction. The elements of the basic structure 40 are formed, for example, from a metallic material, such as a light metal, for example, on the basis of an aluminum material.

The aircraft passenger seats 3, 4 formed by the basic structure 40 can be arranged fixedly, for example, can be screwed, via the basic structure 40 to, for example, a cabin floor of an aircraft passenger cabin. The basic structure 40 comprises, in particular, a plurality of seat dividers 41 to 44, here, for example, four seat dividers, and cross rails 45, 46 which run transversely with respect to the sitting direction and comprise the front cross rail 45 and the rear cross rail 46 arranged behind the latter, as seen in the sitting direction 2. The cross rails 45, 46 are cylindrical profiles differing in each case in diameter.

Preferably, the two cross rails 45, 46 are arranged on the seat dividers 41-44 or the two cross rails 45, 46 protrude in the longitudinal direction thereof or with their longitudinal axis through respective vertically oriented planar surface sides of the seat dividers 41-44.

The two cross rails 45, 46 advantageously run spaced apart, in particular, are oriented generally parallel to each other. The cross rails 45, 46 are advantageously oriented horizontally.

The basic structure 40 comprises a structural assembly 50 belonging to the aircraft passenger seat 3 and a further structural assembly 51 belonging to the aircraft passenger seat 4.

The structural assembly 50 comprises a connecting structural component 49 and two structural components 47 and 48, the respective upper end sections of which are connected via the connecting structural component 49, the connecting structural component 49 spanning a horizontal distance between the two structural components 47 and 48. The two structural components 47 and 48 are connected releasably, but fixedly, to the seat dividers 41 and 42 at their respective upper end.

In their upper end section, which is somewhat wider than the lower section, the two structural components 47 and 48 are configured so as to be slightly angled spatially obliquely forward.

The structural assembly 50 spans the region in which the backrest 6 is present on the finished aircraft passenger seat 3.

The structural components 47, 48 are preferably flat, plate-like, narrow components made, for example, of a honeycomb-like sandwich structure or sandwich structure provided with inner cavities, preferably with an inner wave-trough structure and a covering on both sides by means of a respective thin, planar covering element, for example, made from a light metal sheet.

What has been stated regarding the structural assembly 50 applies correspondingly to the structural assembly 51 which is constructed identically to the structural assembly 50.

The structural assembly 51 comprises a connecting structural component 54 and two structural components 52 and 53, the respective upper end sections of which are connected via the connecting structural component 54, the connecting structural component 54 spanning a horizontal distance between the two structural components 52 and 53. The two structural components 52 and 53 are connected releasably, but fixedly, to the seat dividers 43 and 44 at their respective upper end.

For the releasable attaching of the respective table top 33 to at least one of the structural components 47, 48 or 52, 53, preferably to the two structural components 47, 48 or 52, 53, a connecting arrangement is provided.

In the exemplary embodiment which is illustrated, two connecting arrangements 55 and 56 are provided for each of the two table tops 33. Each connecting arrangement 55 and 56 has adjustment mechanism 57 for adjusting a mounting position of the table top 33 relative to the associated structural component 47, 48 or 52, 53.

Figure 4:
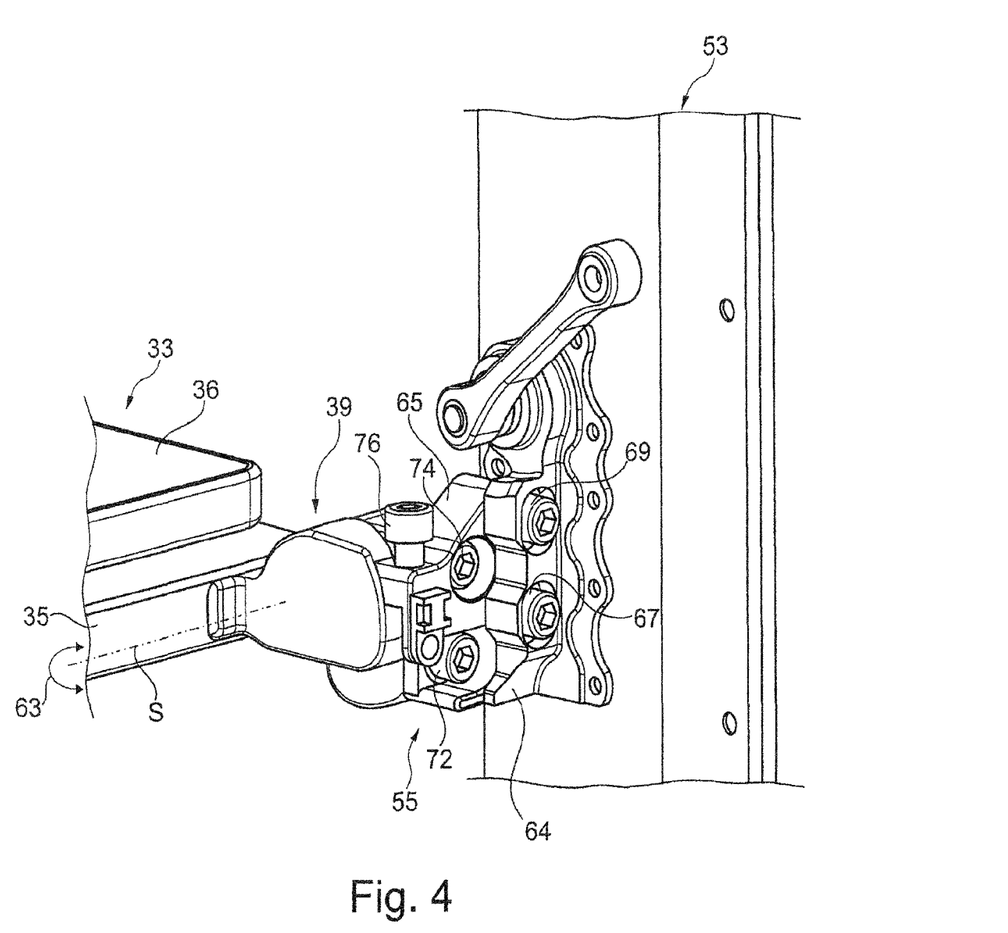
FIG. 4 shows an enlarged detail according to the outlined region A in FIG. 3.
Figure 5:
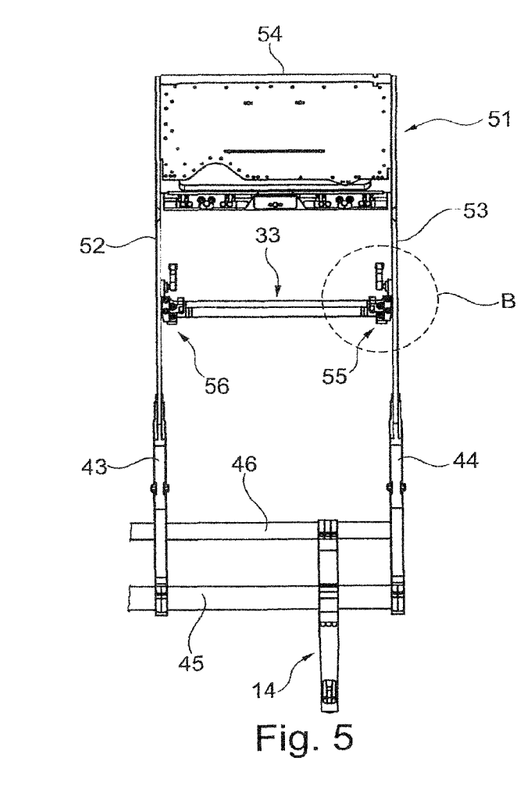
FIG. 5 shows a detail of the basic structure of the aircraft passenger seats according to FIG. 3 in a front view.
Figure 6:
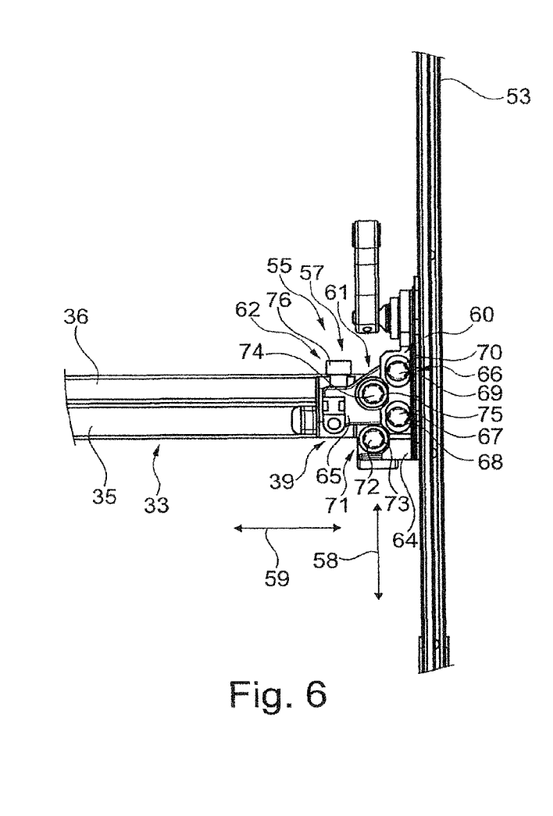
FIG. 6 shows an enlarged detail according to the outlined region B in FIG. 5.

The adjustment mechanisms 57 are designed to establish the mounting position of the table top 33 along a first displacement direction 58 and additionally along a second displacement direction 59, the first displacement direction 58 and the second displacement direction 59 being at an angle to each other, here perpendicular to each other. The adjustment mechanisms 57 comprise height adjustment mechanism 60, lateral adjustment mechanism 61 and inclination adjustment mechanism 62.

With the height adjustment mechanism 60, the mounting position of the table top 33 is adjusted in the first displacement direction 58 or in the vertical displacement direction 58, which is accordingly a height displacement direction.

With the lateral adjustment mechanism 61, the mounting position of the table top 33 is adjusted in the second displacement direction 59 or in the horizontal displacement direction 59, which is accordingly a lateral displacement direction.

With the inclination adjustment mechanism 62, in the table top use position, the inclination of the table top 33 is adjusted in an inclination direction 63 about a joint axis of the respective fitting part 38, 39, i.e. about the pivot axis S of the table top 33 that is provided by the joint arrangement together with the fitting 37 (see FIG. 4).

With reference to the connecting arrangement 55, with the further connecting arrangement 56 being correspondingly configured, the connecting arrangement 55 comprises a plurality of connecting components, a first connecting component 64 being fastened to the structural component 53 and the first connecting component 64 being connected to a second connecting component 65 of the connecting arrangement 55.

The second connecting component 65 is connected to the fitting part 39 of the joint arrangement.

The height adjustment mechanism 60 comprises a screw connection 66 with a first screw element 67 which reaches through a first elongated hole 68 in the connecting component 64 and with a second screw element 69 which reaches through a second elongated hole 70 in the connecting component 64. With the displacement region which is dependent on the length of the elongated holes 68, 70 and with the variably selectable reach-through position of the screw elements 67, 69, the height position of the table top 33 is adjustable.

The lateral adjustment mechanism 61 comprises a screw connection 71 with a first screw element 72 which reaches through a first elongated hole 73 in the connecting component 65 and with a second screw element 74 which reaches through a second elongated hole 75 in the connecting component 65.

The inclination adjustment mechanism 62 comprises a screw arrangement with a screw element 76 which, by means of rotation, causes a displacement in accordance with the displacement or inclination direction 63 of part of the joint arrangement about the pivot axis S, provided by the joint arrangement, in the use position of the table top 33.

LIST OF REFERENCE SIGNS 1 seat row
2 sitting direction
3 aircraft passenger seat
4 aircraft passenger seat
5 seat base
6 backrest
7 housing
8 leg support
9 seat base
10 backrest
11 housing
12 leg support
13 supporting leg
14 supporting leg
15 strut
16 end region
17 mounting point
18 strut
19 end region
20 mounting point
21 bracing element
22 strut
23 end region
24 mounting point
25 strut
26 end region
27 mounting point
28 bracing element
29 armrest
30 armrest
31 console
32 multimedia unit
33 table top
33a covering
34 storage compartment
35, 36 table top component
37 fitting
38 fitting part
39 fitting part
40 basic structure
41-44 seat dividers
45 cross rail
46 cross rail
47, 48 structural component
49 connecting structural component
50 structural assembly
51 structural assembly
52, 53 structural component
54 connecting structural component
55, 56 connecting arrangement
57 adjustment mechanism
58 displacement direction
59 displacement direction
60 height adjustment mechanism
61 lateral adjustment mechanism
62 inclination adjustment mechanism
63 inclination direction
64 connecting component
65 connecting component
66 screw connection
67 screw element
68 elongated hole
69 screw element
70 elongated hole
71 screw connection
72 screw element
73 elongated hole
74 screw element
75 elongated hole
76 screw element

The invention claimed is:

1. An aircraft passenger seat comprising a structural component on which a table top of the aircraft passenger seat is held via a joint arrangement,
wherein the structural component belongs to a seat frame of the aircraft passenger seat,
wherein the structural component is elongate, plate-like and extends vertically in height in a region of a backrest of the aircraft passenger seat,
wherein the table top is pivotable about a pivot axis of the joint arrangement,
wherein a connecting arrangement for releasably attaching the table top to the structural component is provided, wherein the connecting arrangement comprises a plurality of connecting components, a first connecting component being fastened to the structural component and the first connecting component being connected to a second connecting component of the connecting arrangement, the connecting arrangement also comprising an adjustment mechanism for adjusting providing a mounting position of the table top relative to the structural component,
wherein the adjustment mechanism comprises a screw connection with a screw element which reaches through an elongated hole and is screwable into a threaded section,
the adjustment mechanism being designed in such a manner that the mounting position can be selected from a plurality of different mounting positions for the table top relative to the structural component,
wherein the adjustment mechanism is designed to establish the mounting position of the table top along a first displacement direction and in addition to establish the mounting position of the table top along a second displacement direction, the first displacement direction and the second displacement direction being at an angle with respect to each other, wherein the structural component has a sandwich structure in order to obtain a high mechanical stability at a low weight, and wherein the table top of the aircraft passenger seat further includes a second connecting arrangement for releasably attaching a second structural component wherein the structural components are spaced apart from each other.

2. The aircraft passenger seat as claimed in claim 1, wherein the table top is pivotable with the joint arrangement from an upright position of the table top folded up against the structural component into a use position of the table top protruding on the structural component and back from the use position into the upright position, the adjustment mechanism comprising an inclination adjustment mechanism for adjusting the inclination of the table top in the use position of the table top.

3. The aircraft passenger seat as claimed in claim 2, wherein the inclination adjustment mechanism comprises a screw element, rotation of the screw element causing a part of the joint arrangement to be displaced about the pivot axis provided by the joint arrangement.

4. The aircraft passenger seat as claimed in claim 1, wherein the adjustment mechanism comprises a height adjustment mechanism for adjusting a height mounting position of the table top along the first displacement direction, which is a vertical displacement direction.

5. The aircraft passenger seat as claimed in claim 4, wherein the height adjustment mechanism comprises a screw connection with a first screw element which reaches through a first elongated hole and with a second screw element which reaches through a second elongated hole.

6. The aircraft passenger seat as claimed in claim 1, wherein the adjustment mechanism comprises a side adjustment mechanism for adjusting a side mounting position of the table top along the second displacement direction, which is a horizontal displacement direction.

7. The aircraft passenger seat as claimed in claim 6, wherein the side adjustment mechanism comprises a screw connection with a first screw element which reaches through a first elongated hole and with a second screw element which reaches through a second elongated hole.

8. The aircraft passenger seat as claimed in claim 1, wherein the second connecting component is connected to the joint arrangement.

9. A seat row comprising a plurality of aircraft passenger seats present next to one another as claimed in claim 1.

* * * * *